United States Patent
Himuro et al.

[11] Patent Number: 6,123,130
[45] Date of Patent: Sep. 26, 2000

[54] TIRE HAVING IMPROVED WET STOPPING CAPABILITY

[75] Inventors: Yaso Himuro, Tachikawa, Japan; Bill J. Wallet, Marshallville, Ohio; David M. Reep, Copley, Ohio; Shawn L. Copeland, Akron, Ohio; Yukio Yamakawa, Cuyahoga Falls, Ohio; Michael J. Ferraco, Akron, Ohio

[73] Assignee: Bridgestone/Firestone, Inc., Akron, Ohio

[21] Appl. No.: 08/967,406

[22] Filed: Nov. 11, 1997

[51] Int. Cl.⁷ .............................. B60C 11/04; B60C 11/12; B60C 113/00
[52] U.S. Cl. ................................. 152/209.3; 152/209.18; 152/209.22; 152/901; 152/DIG. 3
[58] Field of Search ............................... 152/209.2, 209.3, 152/209.18, 209.22, 900, 901, DIG. 3; D12/141, 142, 145, 146, 147, 148

[56] References Cited

U.S. PATENT DOCUMENTS

| | | | |
|---|---|---|---|
| D. 287,579 | 1/1987 | Cain | D12/147 |
| D. 296,541 | 7/1988 | Gettys et al. | D12/147 |
| D. 309,883 | 8/1990 | Barnett | D12/143 |
| D. 323,801 | 2/1992 | Kajita | D12/147 |
| D. 330,882 | 11/1992 | Hasegawa | D12/147 |
| D. 368,450 | 4/1996 | Lassan et al. | D12/141 |
| 2,261,025 | 10/1941 | Havens . | |
| 2,272,879 | 2/1942 | Hargraves . | |
| 3,494,401 | 2/1970 | Bush . | |
| 4,362,201 | 12/1982 | Zinnen et al. . | |
| 5,240,053 | 8/1993 | Baumhofer et al. . | |

FOREIGN PATENT DOCUMENTS

| | | |
|---|---|---|
| 1313116 | 1/1993 | Canada . |
| 612631 | 8/1994 | European Pat. Off. . |
| 3625120 | 1/1988 | Germany . |
| 58-167207 | 10/1983 | Japan . |
| 60-236806 | 11/1985 | Japan . |
| 61-291204 | 12/1986 | Japan . |
| 63-141806 | 6/1988 | Japan . |
| 63-159112 | 7/1988 | Japan . |
| 2-36401 | 8/1990 | Japan . |
| 3-262170 | 11/1991 | Japan . |
| 4-201610 | 7/1992 | Japan . |
| 6-55913 | 3/1994 | Japan . |
| 8-72508 | 3/1996 | Japan . |

OTHER PUBLICATIONS

Tire Review, Michelin Driving Tire Science advertisement, p. 5, Oct. 1994.

*Primary Examiner*—Steven D. Maki
*Attorney, Agent, or Firm*—David A. Thomas

[57] ABSTRACT

A tire tread has a total of four circumferential ribs and three circumferential grooves. The four ribs include two intermediate ribs and two outer ribs, and the three grooves include a center groove and two outer grooves. The two intermediate ribs are between the center groove and the two outer grooves, and the outer ribs are on the opposite sides of the outer grooves from the intermediate ribs. Rib cross slots and cross sipes extend outwardly from the outer grooves into the intermediate and outer ribs in herringbone patterns. The cross slots and cross sipes extend less than the full width of the ribs to provide the intermediate ribs with circumferential inner portions adjacent the center groove that are devoid of cross slots. These circumferential inner portions of the intermediate ribs have a plurality of circumferentially-spaced cross sipes that do not intersect the center groove. The rib cross slots are circumferentially-spaced a plurality of different distances to define a plurality of rib blocks having different lengths. Shorter rib blocks have a single cross sipe and longer rib blocks have double cross sipes. Shoulder cross slots intermediate the cross slots in the outer ribs overlap the outer rib cross slots by 25–35% of the outer rib cross slot length. The rib and shoulder cross slots have sloping closed end surfaces that intersect the outer surface of the tread at an angle of 35–42°. Shoulder and outer rib cross sipes that are positioned opposite from the rib and shoulder cross slots do not intersect or overlap the rib or shoulder cross slots.

31 Claims, 9 Drawing Sheets

TIRE HAVING IMPROVED WET STOPPING CAPABILITY

BACKGROUND OF THE INVENTION

This application relates to the art of tires and, more particularly, to physical characteristics of the tire tread surface that engages a pavement. The invention is particularly applicable to a combination of features and will be described with specific reference thereto. However, it will be appreciated that the invention has broader aspects and that certain individual features can be used without necessarily being combined with others.

Desirable features of a tire include low noise generated by rotation of the tire against a pavement, good wearability and good traction on both dry and wet surfaces. Tires that are designed to optimize one or more of these features often perform poorly in others. Instead of sacrifing the performance of one or more of these characteristics in order to enhance the performance of others, the tire constructed in accordance with the present application provides high performance for all of these desirable features.

SUMMARY OF THE INVENTION

A circumferential tread of a tire has a road engaging surface that consists essentially of four circumferential ribs that include two intermediate ribs and two outer ribs.

The tread has three continuous circumferential grooves that include a center groove between the intermediate ribs and a pair of outer grooves. One outer groove is located between each intermediate rib and an adjacent outer rib. In a preferred arrangement, each of the grooves has substantially the same groove depth while the outer grooves are substantially wider than the center groove.

Each rib has a plurality of cross slots and a plurality of cross sipes circumferentially-spaced therearound. Each cross slot and cross sipe extends less than the width of the rib in which it is located. Thus, there are no cross slots, sipes or combinations of cross slots and sipes connected end-to-end that extend unbroken entirely across the width of any rib. This unbroken characteristic of the ribs makes them essentially continuous around the entire circumference of the tire.

In a preferred arrangement, the center groove sidewalls are continuous and uninterrupted by any cross slots, cross sipes, notches or any other openings.

The cross slots include circumferentially-spaced intermediate rib cross slots that extend into the intermediate ribs from the outer grooves. Circumferentially-spaced outer rib cross slots extend into the outer ribs from the outer grooves. Adjacent ones of the cross slots define rib blocks therebetween. The cross slots are circumferentially-spaced a plurality of different distances to provide a plurality of different rib block lengths that include short block lengths and long block lengths. At least the short block lengths in both the intermediate ribs and the outer ribs have a single sipe extending thereinto from the outer grooves. At least the long block lengths in both the intermediate ribs and the outer ribs have a pair of spaced-apart sipes extending thereinto from the outer grooves.

In a preferred arrangement, the single sipes are positioned within approximately 10% of the mid-length of the rib blocks in which they are located. Each sipe in the pairs of sipes or double sipes is positioned within approximately 10% of one-third the length of the rib blocks in which they are located.

In the preferred arrangement, there are five different rib block lengths, the two shortest rib block lengths have single sipes therein and the remainder of the different rib block lengths have double sipes therein.

Shoulder buttresses having a plurality of circumferentially-spaced buttress cross slots therein are located outwardly of the outer ribs. The buttress cross slots are generally opposite from and generally aligned with the single and double sipes in the outer ribs, and do not intersect or overlap the sipes.

In accordance with another aspect of the application, the outer rib cross slots and the buttress cross slots are circumferentially-spaced from one another while extending past one another transversely of the tread to refine an overlap that is between about 25–35% of the length of an outer rib cross slot.

Each buttress cross slot extends into an outer rib to overlap the outer rib cross slots, and the distance that the buttress cross slots extend into an outer rib is less than one-half the width of an outer rib.

In a preferred arrangement, each intermediate rib cross slot extends not more than about one-half the width of each intermediate rib. Each outer rib (ross slot extends substantially more than one-half the width of each outer rib.

In accordance with another aspect of the application, the cross slots have inclined cross slot ends that intersect a line tangent to the pavement engaging surface of the tread at an angle of about 35–42°.

Both the center and outer circumferential grooves have groove sidewalls that slope outwardly from the groove bottoms. The sloping angles of the outer groove sidewalls are substantially greater than the sloping angles of the center groove sidewalls.

The cross slots and sipes that extend outwardly from the outer grooves into the intermediate ribs and outer ribs are inclined to form chevron or herringbone patterns with the groove being the spine of the herringbone.

In accordance with another aspect of the application, a circumferential inner rib portion of each intermediate rib adjacent the center groove is devoid of cross slots. Sipes are provided in these inner rib portions that terminate short of the center groove sidewalls.

The cross slots that extend outwardly from the outer grooves into the outer ribs and intermediate ribs have cross slot entrance openings that are located substantially opposite one another on opposite sides of the outer grooves.

It is a principal object of the present invention to provide an improved tire tread that has good wearability and good traction on both dry and wet surfaces.

It is also an object of the invention to provide a tire tread having cross slots and sipes arranged to enhance traction on both dry and wet surfaces.

It is an additional object of the invention to provide a tire tread with cross slots and sipes arranged to minimize squirm as the tire rolls in engagement with a pavement.

It is also an object of the present invention to provide a tire tread with an optimum number of ribs and grooves for good performance on both dry and wet surfaces.

DESCRIPTION OF A PREFERRED EMBODIMENT

Figure 1:
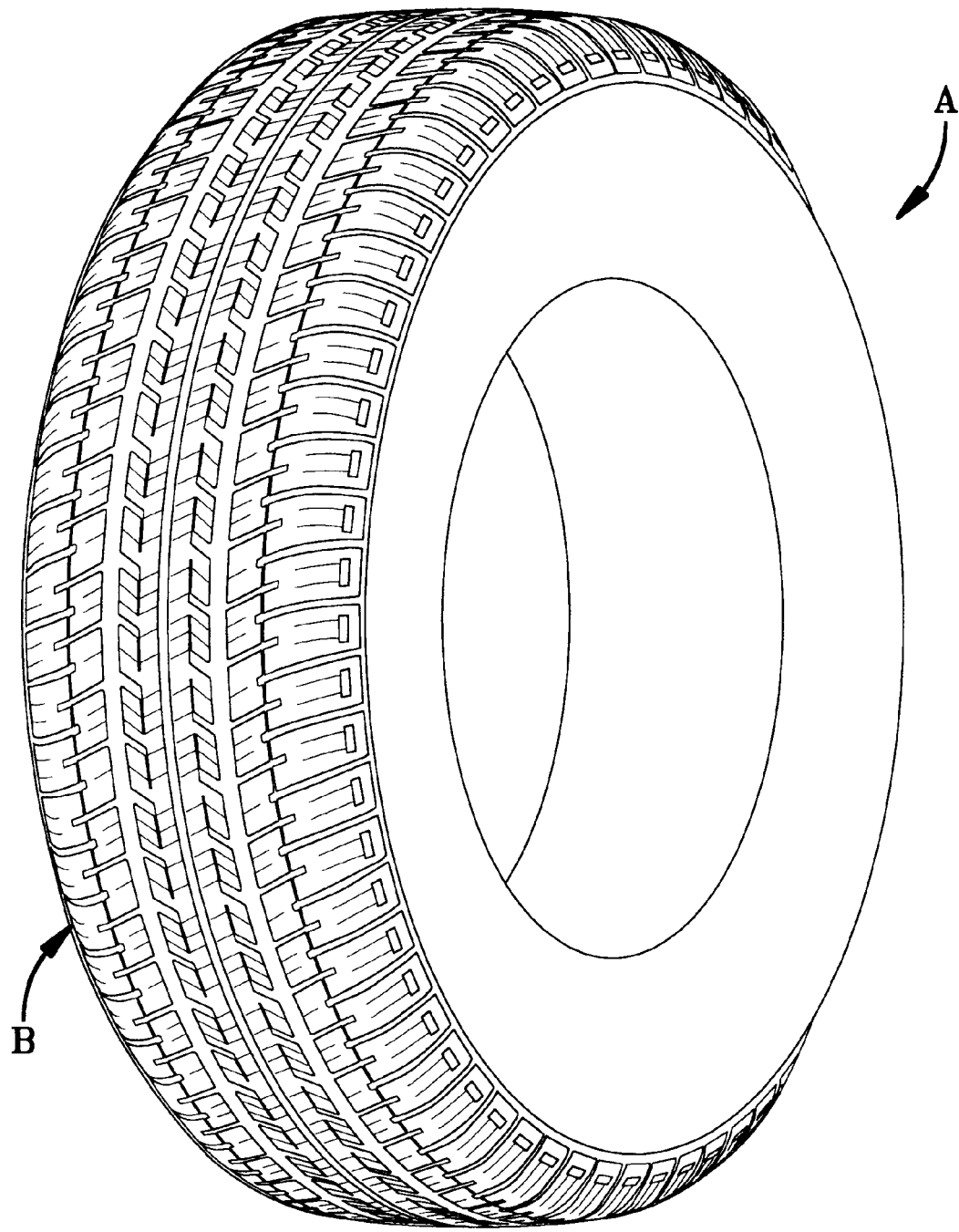
FIG. 1 is a perspective illustration of a tire constructed in accordance with the present application.

Referring now to the drawings, wherein the showings are for purposes of illustrating a preferred embodiment of the invention only and not for purposes of limiting same, FIGS. 1–4 show a tire A having a circumferential tread B that rolls in engagement with a pavement as the tire rotates.

Figure 2:
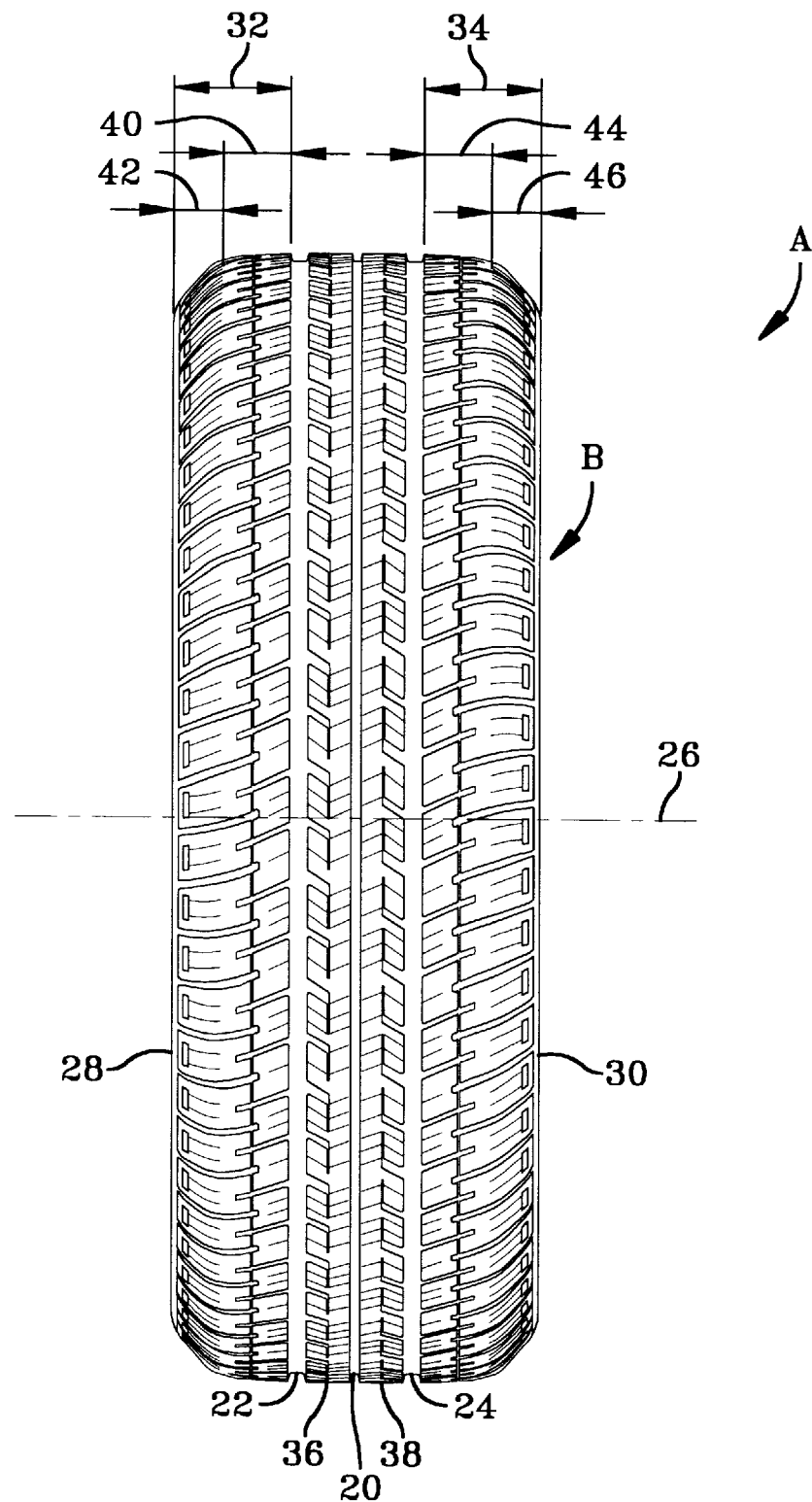
FIG. 2 is a front elevational view thereof.
Figure 3:
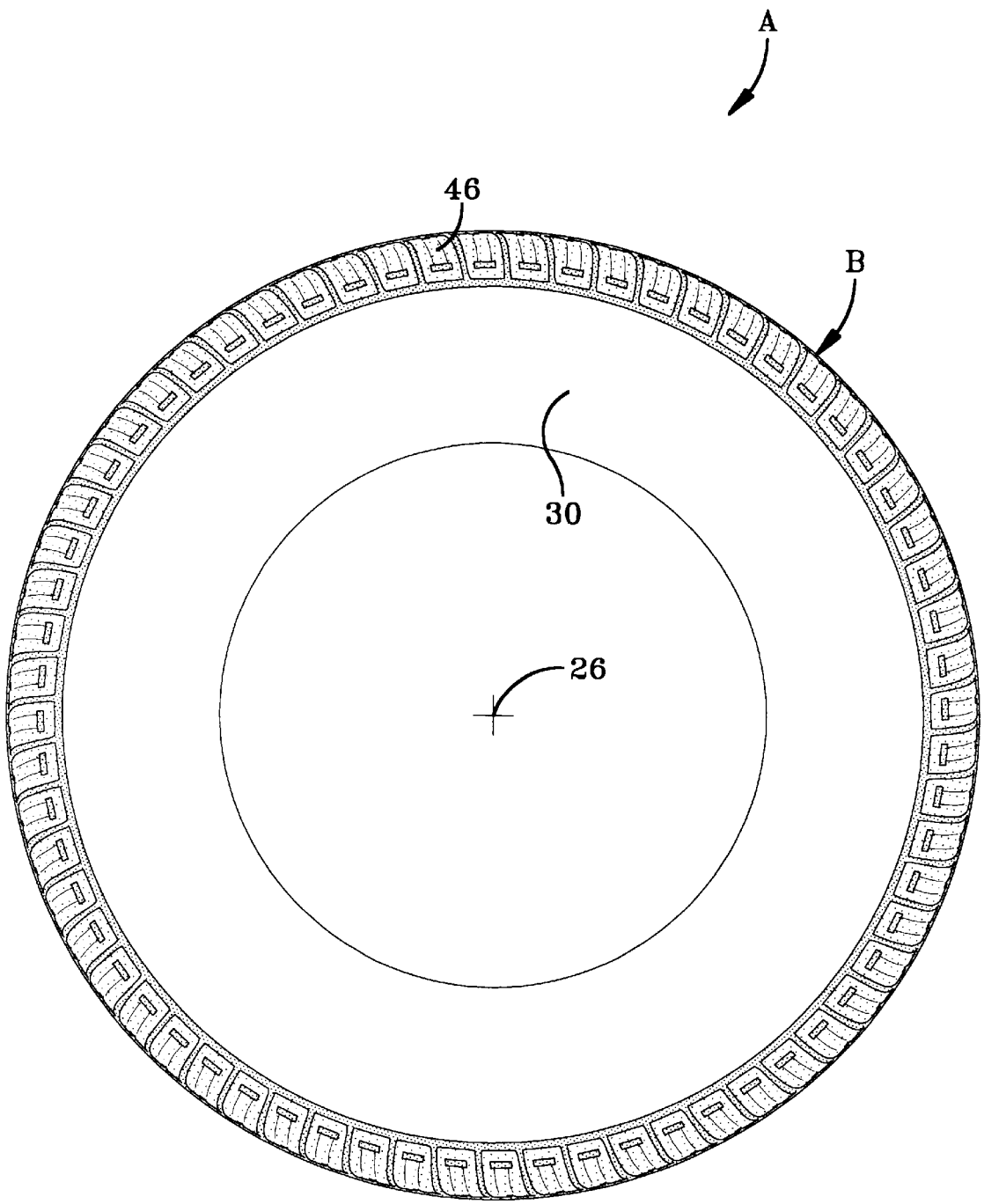
FIG. 3 is a side elevational view thereof.
Figure 4:
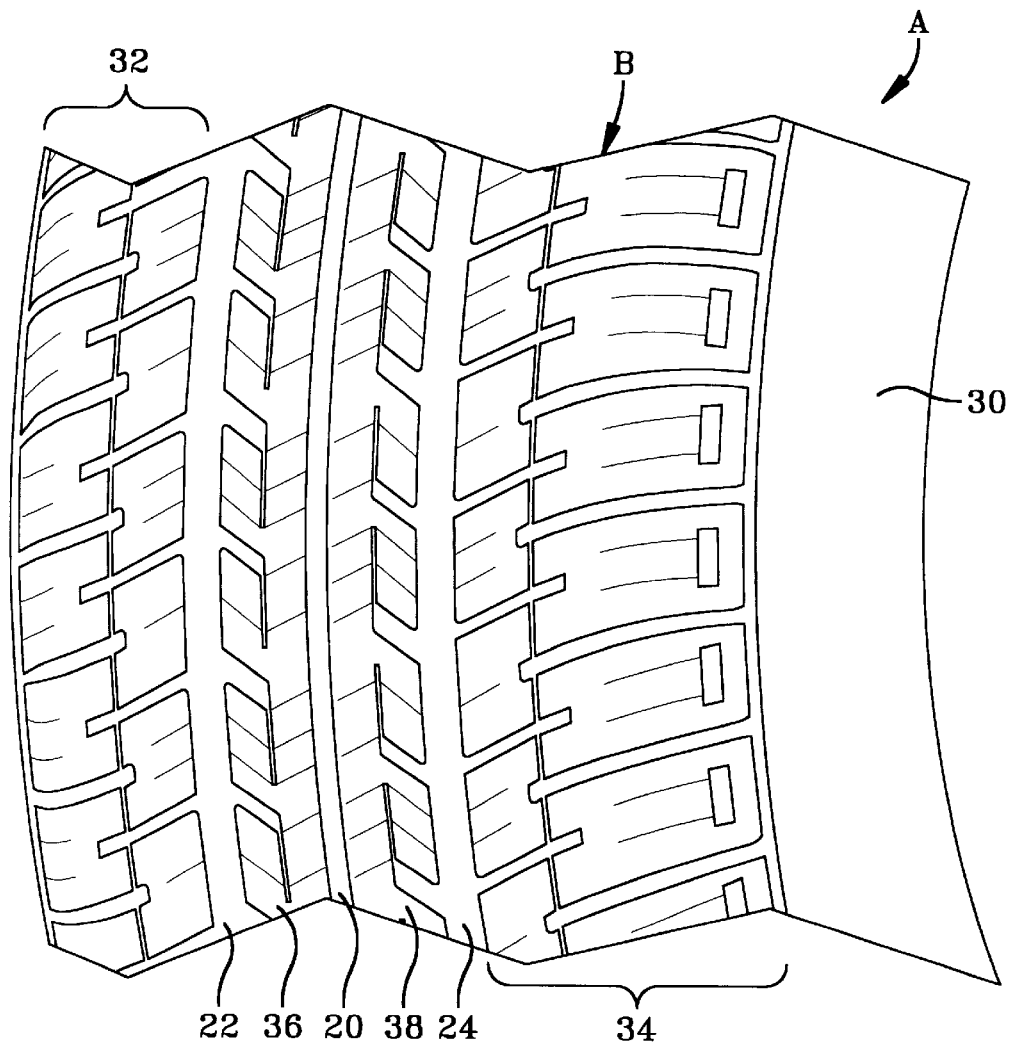
FIG. 4 is a an enlarged perspective illustration of a portion of the tire tread.

As best shown in FIG. 2, tire tread B has three continuous circumferential grooves that include a center groove 20 and a pair of outer grooves 22, 24. Grooves 20, 22 and 24 are spaced-apart parallel to tire rotational axis 26, and outer grooves 22, 24 are equidistantly spaced from the center line of center groove 20.

Tire tread B extends between opposite tire sidewalls 28 and 30, and includes shoulder regions 32 and 34, and intermediate ribs 36 and 38, and outer ribs 40 and 44. Shoulder regions 32 and 34 extend from outer grooves 22 and 24 to sidewalls 28 and 30. Intermediate ribs 36 and 38 are located between center groove 20 and outer grooves 22 and 24.

Shoulder region 32 includes an outer rib 40 and a buttress 42, and shoulder region 34 includes an outer rib 44 and a buttress 46. The approximate location of the boundary between an outer rib and a buttress is defined by the intersection of lines that are tangent to the surface of an outer rib and the surface of an adjacent buttress. That portion of tread B that extends across intermediate ribs 36 and 38, and outer ribs 40 and 44, is the approximate width of the tire tread that engages a pavement. The precise distance varies from tire-to-tire and with inflation pressure. Thus, intermediate ribs 36 and 38, and outer ribs 40 and 44, are road engaging ribs that define the road engaging areas of the tire tread.

Each outer rib 40, 44 is 30–50% wider than each intermediate rib 36, 38, and more preferably 35–45% wider. In one arrangement, each outer rib is about 40% wider than each intermediate rib 36, 38.

Figure 5:
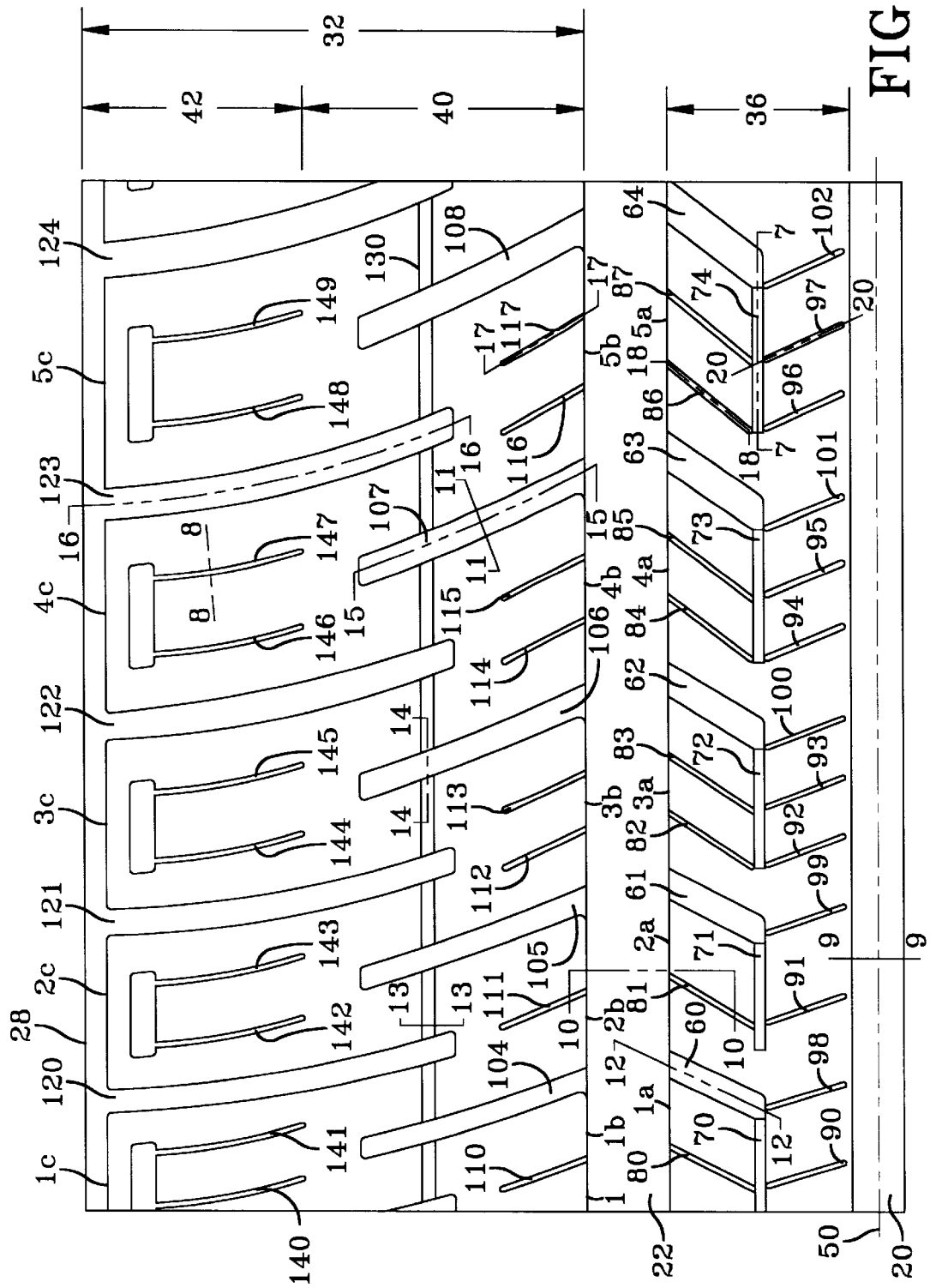
FIG. 5 is a plan view of a positive model for a tire mold and also represents the tire construction.

FIG. 5 is a plan view of a circumferential portion of a positive model of the type that is used for casting an aluminum mold in which tires are molded. Therefore, the depiction in FIG. 5 is also used to illustrate the construction of the tire that is produced in the mold. The circumferential center line of a tire is indicated at 50 in FIG. 5, and it will be recognized that the remaining width of the tire at the bottom of FIG. 5 is not illustrated. The remaining tire width is obtained by inverting that portion of FIG. 5 above center groove 20 and attaching it to the opposite side of center groove 20.

In accordance with the present application, each circumferential rib is continuous in the sense that it is not transversely interrupted by a single cross slot, sipe or combination of a cross slot and sipe connected end-to-end. In addition, all of grooves 20, 22 and 24 do not zig zag or meander around the circumference of the tire, and are substantially circular. The sidewalls of the grooves slope outwardly from the groove bottoms, and the entire circumferential surface of each groove sidewall lies on the surface of a cone.

Circumferentially-spaced intermediate rib cross slots 60–64 extend into intermediate rib 36 from outer groove 22. Intermediate rib cross slots 60–64 are substantially parallel to one another and extend outwardly from outer groove 22 at angles of approximately 65°. Intermediate rib cross slots 60–64 extend less than the full width of intermediate rib 36 and preferably extend not more than approximately one-half of the width of intermediate rib 36.

Cross slots 60–64 are of different widths and are spaced-apart different distances to provide a plurality of different length tread elements used to provide noise treatment in a known manner. The different length tread elements are scrambled around the circumference of a tire to reduce noise generated by rotation of the tire in engagement with a pavement. Center lines are drawn in FIG. 5 between adjacent intermediate rib cross slots 60–64 to illustrate five different tread element lengths identified by numerals 1–5.

Intermediate rib cross slots 60–64 intersect terminal ends of shallow and narrow circumferential slots 70–74. Each circumferential slot 70–74 has a length that is substantially less than the tread element length 1–5 in which it is located. For the shorter tread elements, the circumferential slots are a little longer than one-half of the tread element length. For the longer tread elements, the circumferential slots are about two-thirds of the tread element length.

A plurality of sipes extend outwardly from outer groove 22 into intermediate rib 36. These sipes extend substantially parallel to intermediate rib cross slots 60–64 and are identified by numerals 80–87. Shorter tread element lengths such as 1 and 2 have only one sipe 80 or 81 therein, while longer tread element lengths such as 3, 4, and 5 each has two sipes therein. Intermediate rib cross slots 60–64 form a plurality of rib blocks having different lengths, and single sipes 80 and 81 approximately bisect the rib blocks in which they are located. The rib blocks having double sipes such as 82 and 83 are approximately trisected by the double sipes.

Figure 6:
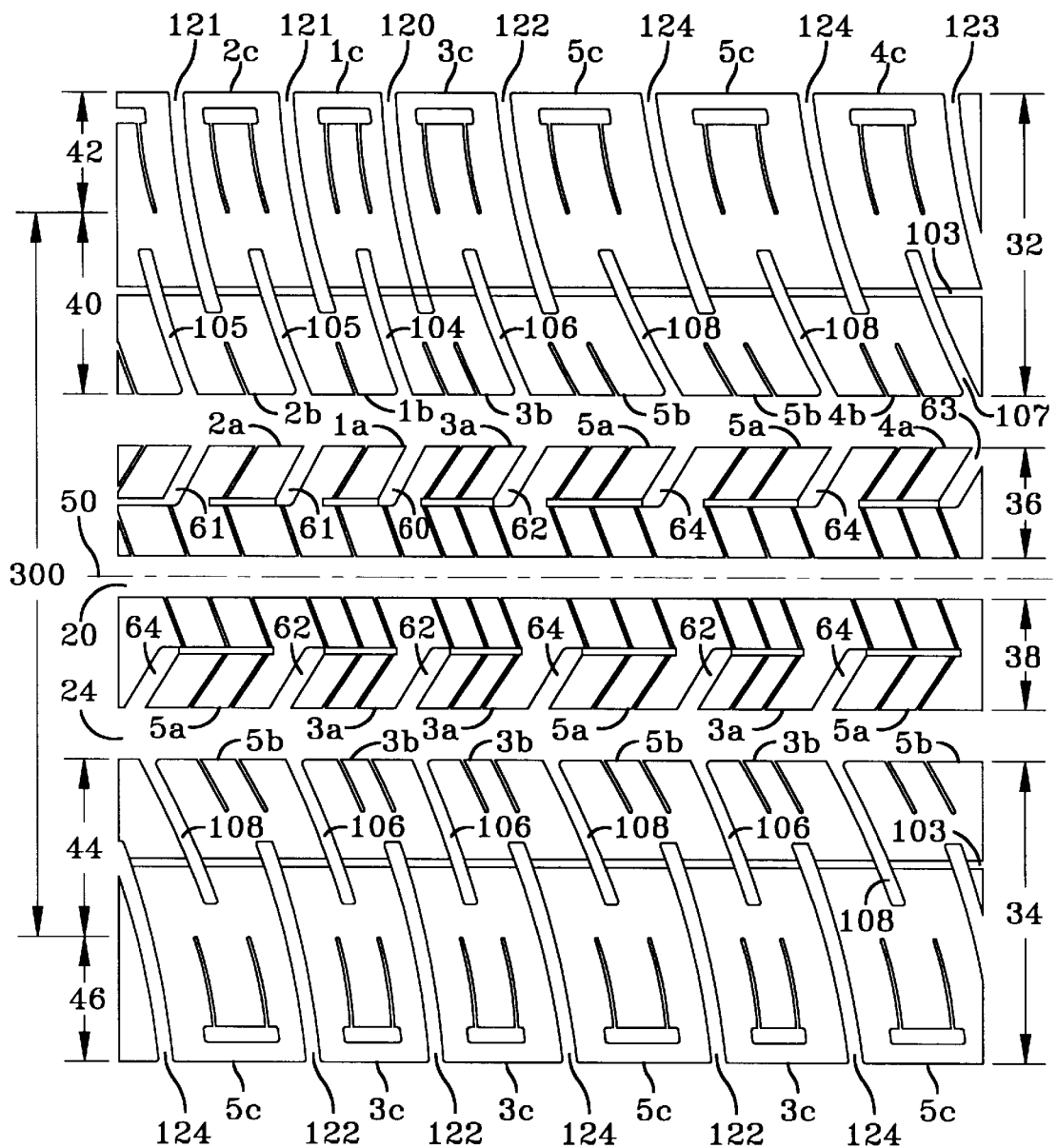
FIG. 6 is a tire flat drawing showing a peripheral section of a tire tread constructed in accordance with the present application.
Figure 7:
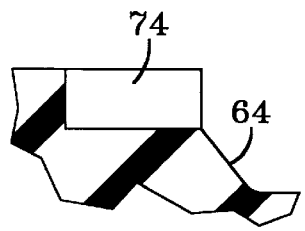
FIG. 7 is a partial cross-sectional elevational view taken generally on line 7—7 of FIG. 5.
Figure 8:
FIG. 8 is a partial cross-sectional elevational view taken generally on line 8—8 of FIG. 5.

Additional sipes 90–97 extend outwardly from circumferential slots 70–74 toward center groove 20 opposite sipes 80–87. Sipes 90–97 terminate short of center groove 20 so that the side walls of center groove 20 are substantially smooth and unbroken by any cross slots, sipes, notches or any other openings. Additional sipes 98–102 extend outwardly opposite cross slots 60–64. Sipes 90–102 are substantially parallel to one another and extend at angles of approximately 65° to tire center line 50. The sipes and cross slots extending outwardly on opposite sides of circumferential slots 70–74 form chevron or herringbone patterns as shown in FIGS. 5 and 6.

Outer rib cross slots 104–108 Extend outwardly from outer groove 20 at angles of approximately 70°. Each outer rib cross slot 104–108 extends less than the entire width of outer rib 40. Sipes 110–117 extend outwardly from outer groove 22 into outer rib 40 substantially parallel to outer rib cross slots 104–108.

Outer rib cross slots 104–108 are spaced different distances according to the different lengths of the tread elements so that there are different length tread rib blocks therebetween. The shorter rib blocks have a single sipe therein as indicated at 110 and 111, while the longer tread elements have two sipes therein as indicated at 112, 117. An individual sipe approximately bisects a shorter tread element while a pair of sipes subdivide longer tread elements approximately into thirds.

Buttress cross slots 120–124 extend inwardly toward outer groove 22 at angles of approximately 80°. The length of outer rib cross slots 104–108 and buttress cross slots 120–124 are such that they overlap one another in circumferentially-spaced relationship. Thus, buttress cross slots 120–124 extend into outer rib 40. The degree of longitudinal overlap of the outer rib cross slots 104–108 and the buttress cross slots 120–124 is such that the overlap length is between 25–35% of the length of an outer rib cross slot. Buttress cross slots 120–124 have different widths and are spaced different distances to define different length blocks therebetween according to the different tread element pitches.

Different length rib blocks between adjacent intermediate rib cross slots 60–64 are identified by characters 1a–5a. Different length rib blocks between adjacent outer rib cross slots 104–108 are identified by characters 1b–5b. Different length buttress blocks between buttress cross slots 120–124 are identified by characters 1c–5c.

A narrow and shallow circumferential slot 130 in outer rib 40 intersects outer rib cross slots 104–108 and buttress cross slots 120–124. Circumferential slot 130 is located slightly more than half way from outer groove 22 toward the intersection of outer rib 40 with buttress 42. Buttress sipes 140–149 extend substantially parallel to buttress cross slots 120–124 and are located substantially opposite from outer rib cross slots 104–108. Each pair of buttress sipes located between adjacent buttress cross slots approximately straddles an opposite outer rib cross slot.

Circumferential grooves 20, 22 and 24 have the same depth. Outer grooves 22 and 24 have a width at the outer surface of the tire tread that is approximately two times the width of center groove 20 at the outer surface of the tread. By way of example and not by way of limitation, if the width of center groove 20 at the outer surface of the tread is 10 millimeters, the width of each outer groove 22 and 24 at the outer surface of the tire tread is about 18 millimeters. Thus, outer grooves 22 and 24 have a width that is slightly lees than two times the width of center groove but not more than about 15 percent less. Circumferential slots 130 have a depth that is about one-third of the depth of circumferential grooves 20, 22, and 24. All of the cross slots have a depth that is about three-fourths of the depth of the circumferential grooves. Circumferential slots 70–74 in the intermediate ribs have a depth that is approximately one-third the depth of cross slots 60–64.

Figure 17:
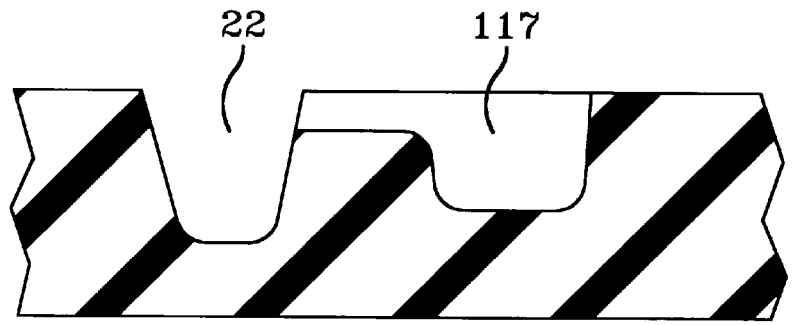
FIG. 17 is a partial cross-sectional elevational view taken generally on line 17—17 of FIG. 5.

All of sipes 110–117 that extend outwardly into an outer rib from an outer groove 22 have the same size and shape. FIG. 17 shows such a sipe 117 having a depth adjacent outer groove 22 that is approximately one-fourth the depth of groove 22. This shallow depth of sipe 117 extends over approximately one-half of its length. The remaining depth of sipe 117 remote from outer groove 122 is approximately three-fourths the depth of groove 22.

Figures 18, 19:
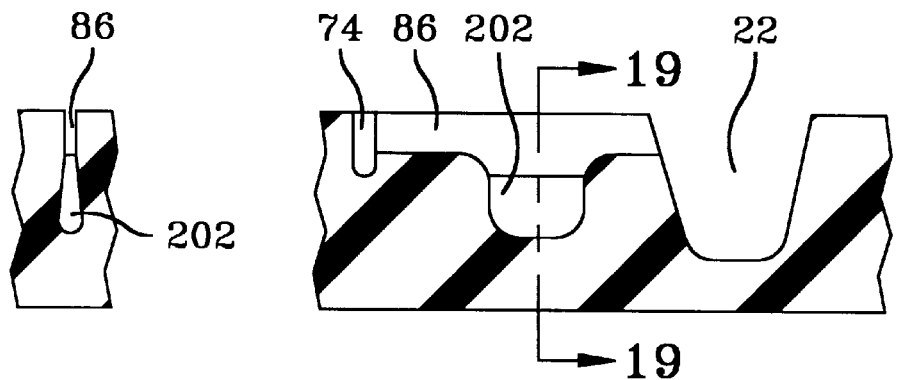
FIG. 18 is a partial cross-sectional elevational view taken generally on line 18—18 of FIG. 5.
FIG. 19 is a partial cross-sectional elevational view taken generally on line 19—19 of FIG. 18.

All of the sipes that extend into an intermediate rib from an outer groove, such as sipes 80–87, are flask or keyhole sipes as shown in FIGS. 18 and 19. That is, the deepest portion of the sipe is somewhat bulbous. As shown in FIG. 18, the length of sipe 86 that is adjacent circumferential outer groove 22 and circumferential slot 74 is about one-fourth the depth of outer circumferential groove 22 and about two-thirds the depth of circumferential slot 74. At its Intermediate location, sipe 86 has a depth that is approximately three-fourths the depth of circumferential outer groove 22 and is bulbous as indicated at 202 in FIGS. 18 and 19.

Figure 20:
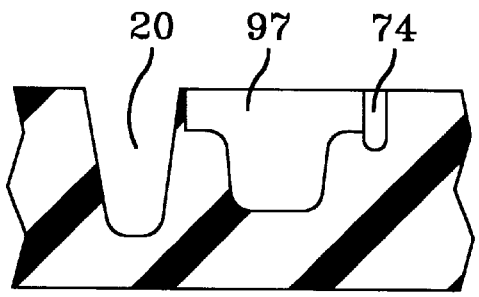
FIG. 20 is a partial cross-sectional elevational view taken generally on line 20—20 of FIG. 5.

All of the sipes that are adjacent circumferential center groove 20 in the intermediate ribs have the same size and shape. One such sipe is illustrated in FIG. 20 as having a depth adjacent center groove 20 and circumferential slot 74 that is about one-fourth the depth of center groove 20 and about two-thirds the depth of circumferential slot 74. The central portion of sipe 97 has a depth that is approximately three-fourths the depth of center groove 20.

Figure 12:
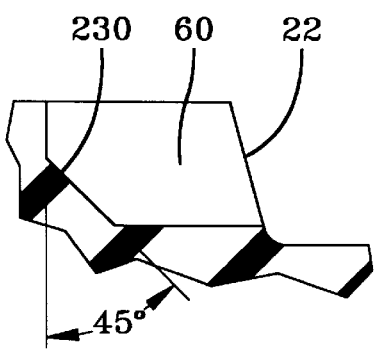
FIG. 12 is a partial cross-sectional elevational view taken generally on line 12—12 of FIG. 5.
Figure 13:
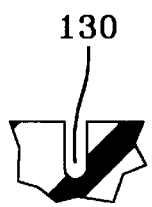
FIG. 13 is a partial cross-sectional elevational view taken generally on line 13—13 of FIG. 5.
Figure 14:
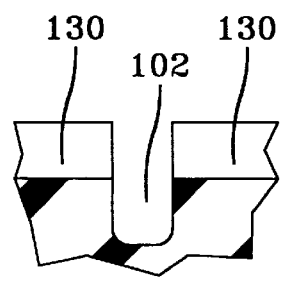
FIG. 14 is a partial cross-sectional elevational view taken generally on line 14—14 of FIG. 5.
Figure 15:
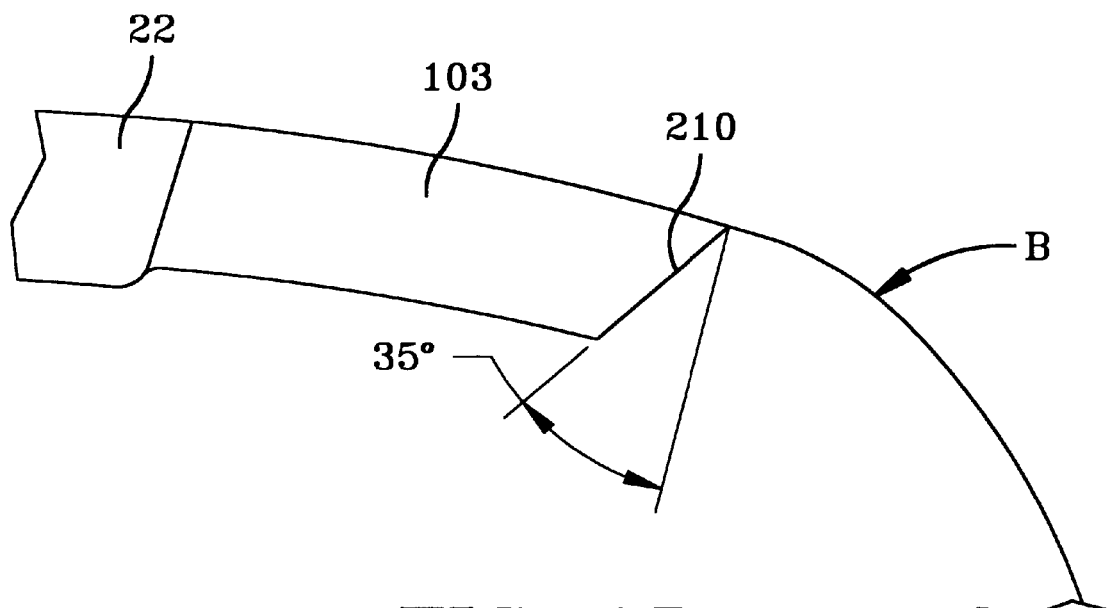
FIG. 15 is a partial cross-sectional elevational view taken generally on line 15—15 of FIG. 5.
Figure 16:
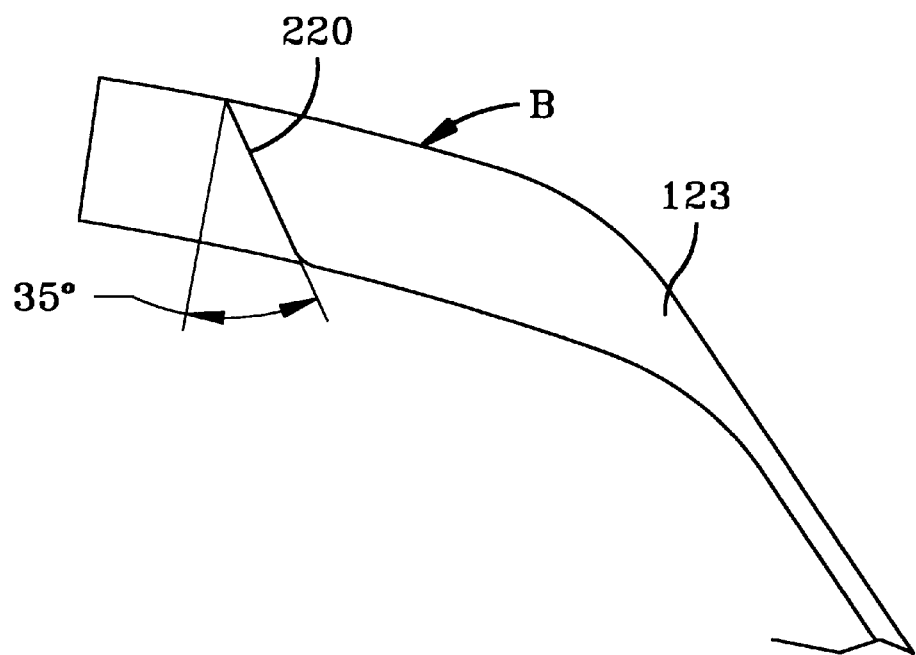
FIG. 16 is a partial cross-sectional elevational view taken generally on line 16—16 of FIG. 5.

As shown in FIG. 15, each cuter rib cross slot terminates in an upwardly inclined cross slot end wall 210 that intersects a line tangent to the outer surface of tread B at an angle of approximately of 35°. This angle preferably is between about 35–42° and most preferably is closer to 35°. FIG. 16 shows the buttress cross slots as having inclined end walls 220 that intersect a line that is tangent to the outer surface of tread B at an angle of about 35°. This angle preferably is between 35–42° and most preferably is closer to 35°. As shown in FIG. 12, each intermediate rib cross slot has an upwardly inclined end wall 230 that occupies approximately one-half the depth of the cross slot and intersects a vertical axis at an angle of approximately 45°.

FIG. 6 shows a portion of a tire tread constructed in accordance with the present application. It is common to make two mold halves from the same positive pattern and the mold halves are reversed when fitted together at tire centerline 50. The mold halves are rotated relative to one another to provide optimum noise reduction in the finished tire. Therefore, the tire is not symmetrical on opposite sides of centerline 50. The directions of the chevron or herringbone patterns formed by the cross slots and sipes are reversed oil opposite sides of centerline 50. The tread element length sequence is reversed on opposite sides of the tire centerline.

Circumferential inner portions of intermediate ribs 36, 38 adjacent center groove 50 are devoid of cross slots or notches. The sipes in such inner portions preferably do not break through the sidewalls of center groove 50. However, it will be recognized that many of the improvements of the present application encompass tires in which sipes or cross slots may intersect the center groove.

Rib blocks between adjacent cross slots are identified by the same reference characters on opposite sides of tire centerline 50 for the same rib block lengths for ease of understanding. Single sipes that approximately bisect short rib block lengths preferably are located within about 10% of the midpoint of such rib blocks. Double sipes that approximately trisect longer rib block lengths preferably are located within about 10% of the positions where they would precisely trisect the longer rib blocks.

The approximate width of the tire tread that engages a pavement is referenced by numeral 300 at the left of FIG. 6. This width includes grooves 20, 22 and 24, and ribs 36, 38, 40 and 44. The width varies from tire-to-tire and with inflation pressure. The approximate boundaries for the road engaging width are located at the intersections between lines that are tangent to the surface of buttresses 42, 46 and outer ribs 40, 44.

Figure 9:
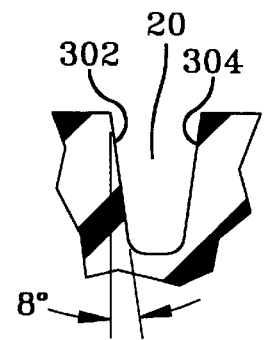
FIG. 9 is a partial cross-sectional elevational view taken generally on line 9—9 of FIG. 5.
Figure 10:
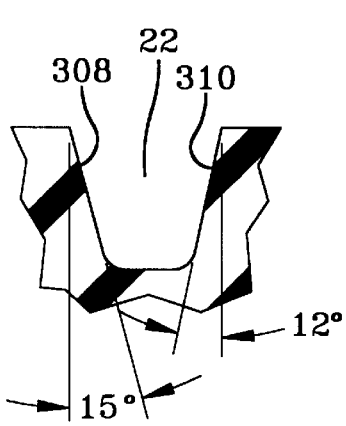
FIG. 10 is a partial cross-sectional elevational view taken generally on line 10—10 of FIG. 5.
Figure 11:
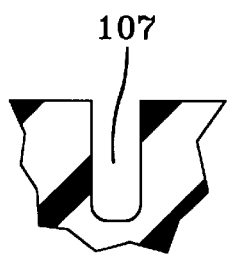
FIG. 11 is a partial cross-sectional elevational view taken generally on line 11—11 of FIG. 5.

As shown in FIGS. 9 and 10, center groove sidewalls 302, 304 slope outwardly from the groove bottom at angles of about 8°. Sidewalls 308, 310 of outer groove 22 slope outwardly from the groove bottom at different angles. Outer groove sidewall 308 that defines a boundary of intermediate rib 36 slopes at a 15° angle, whereas sidewall 310 that defines a boundary of outer rib 40 slopes at a 12° angle. Outer groove 24 has sidewalls with the same arrangement as outer groove 22. All of the groove sidewalls lie on the surface of cones rather than extending in a zig zag or irregular path around the tire circumference.

The width of each intermediate rib 36, 38 is less than the width of each outer rib 40, 44, but greater than one-half the width of each outer rib. The combined width of both intermediate ribs 36, 38 plus the width of center groove 20 is greater than the width of each outer rib 40, 44, and is also greater than the width of one outer rib plus one outer groove. Each outer rib 40, 44 has a width that is substantially greater than the width of each intermediate rib 36, 38 but less than two times the width of each intermediate rib 36, 38.

Although the invention has been shown and described with respect to a preferred embodiment, it is obvious that equivalent alterations and modifications will occur to others skilled in the art upon the reading and Understanding of this specification. The present invention includes all such equivalent alterations and modifications, and is limited only by the scope of the claims.

We claim:

1. In a tire having a circumferential tread:
   said tread having a road engaging surface that consists essentially of four circumferential ribs including two road engaging intermediate ribs and two road engaging outer ribs;
   three circumferential grooves separating said ribs, said grooves including a center groove between said intermediate ribs and an outer groove between each of said intermediate ribs and an adjacent outer rib, each of said grooves having substantially the same groove depth;
   each of said ribs having a rib width;
   each of said four ribs having a plurality of cross slots that extend thereinto from said outer grooves;
   each of said four ribs having a plurality of cross sipes therein;
   said plurality of cross slots and cross sipes being circumferentially-spaced around said ribs;
   each of said plurality of cross slots and cross sipes extending less than the entire width of the intermediate or outer rib in which it is located;
   each of said plurality of cross slots that extend into said outer ribs from said outer grooves extending more than one-half the width of the outer rib in which it is located but less than the entire width of the outer rib in which it is located;
   said center groove being circular circumferentially of said tire tread and having outwardly inclined center groove sidewalls;
   said center groove sidewalls being continuous and uninterrupted by any of said plurality of cross slots and cross sipes or by any other openings; and,
   each of said outer ribs having a width that is 30–50% greater than the width of each of said intermediate ribs.

2. The tire of claim 1 wherein said plurality of cross slots include circumferentially-spaced intermediate rib cross slots extending into said intermediate ribs from said outer grooves and circumferentially-spaced outer rib cross slots extending into said outer ribs from said outer grooves, adjacent ones of said intermediate rib cross slots and said outer rib cross slots having rib blocks therebetween, said intermediate rib cross slots and said outer rib cross slots being circumferentially spaced-apart a plurality of different distances to provide said rib blocks with a plurality of different rib block lengths that include short block lengths and long block lengths, at least said short block lengths in both said intermediate ribs and said outer ribs having a single sipe extending thereinto from said outer grooves, and at least said long block lengths in both said intermediate ribs and said outer ribs having double sipes extending thereinto from said outer grooves.

3. The tire of claim 2 wherein said single sipes are positioned within 10% of the midlength of said rib blocks in which they are located.

4. The tire of claim 3 wherein each sipe in said double sipes is positioned within 10% of one-third the length of said rib blocks in which they are located.

5. The tire of claim 2 wherein there are five different rib block lengths, the two shortest of said five different rib block lengths having said single sipes therein and the remainder of said five different rib block lengths having said double sipes therein.

6. The tire of claim 1 wherein none of said plurality of cross slots, plurality of sipes or combinations of cross slots and sipes connected end-to-end extends continuously across the entire width of any of said ribs.

7. The tire of claim 1 wherein said plurality of cross slots have cross slots ends and said cross slot ends of at least said outer rib cross slots intersect said road engaging surface at an angle of 35–42°.

8. The tire of claim 1 wherein said road engaging surface provides a footprint on a road surface, said footprint having a footprint width axially of said tire, said intermediate ribs and outer ribs being within said footprint width, said tire having shoulder regions that include said outer ribs and extend outwardly beyond said footprint width, said shoulder regions including shoulder buttresses outwardly of said outer ribs, said buttresses having buttress sipes generally opposite from said outer rib cross slots, said outer rib cross slots having outer rib cross slot ends, and said buttress sipes having buttress sipe ends spaced outwardly from said outer rib cross slot ends.

9. In a tire having a circumferential tread that engages a road surface with a footprint having a footprint width, said tread including a pair of road engaging intermediate ribs separated by a circumferential center groove, a circumferential outer groove on the opposite side of each rib in said pair of intermediate ribs from said center groove, said tread including a road engaging outer rib outwardly of each of said outer grooves, each said outer rib having a width that is substantially greater than the width of each of said intermediate ribs but less than two times the width of each said intermediate rib, a plurality of circumferentially-spaced cross slots extending into said intermediate ribs from said outer grooves, said cross slots extending less than the width of each intermediate rib to provide each intermediate rib with a circumferential outer intermediate rib portion adjacent each said outer groove that has said cross slots therein and a circumferential inner intermediate rib portion adjacent said center groove that is devoid of cross slots, said cross slots having intermediate rib blocks therebetween and being spaced-apart a plurality of different distances to provide said intermediate rib blocks with a plurality of different intermediate rib block lengths that include short intermediate rib block lengths and long intermediate rib block lengths, at least said short intermediate rib block lengths having a single cross sipe extending thereinto from said outer grooves, and at least said long intermediate rib block lengths having double cross sipes extending thereinto from said outer grooves.

10. The tire of claim 9 wherein there are five different block lengths, the two shortest of said five different rib block lengths having said single cross sipes therein and the remainder of said five different block lengths having said double cross sipes therein.

11. The tire of claim 9 wherein at least two of the different block lengths in said plurality of different block lengths have said single cross sipes therein and at least two other of the different block lengths in said plurality of different block lengths have said double cross sipes therein.

12. The tire of claim 9 wherein said inner and outer intermediate rib portions each occupy about one-half the width of said intermediate ribs.

13. In a tire having a circumferential tread that includes a pair of circumferential outer grooves and a road engaging outer rib outwardly of each of said outer grooves, road engaging intermediate ribs inwardly of said outer grooves, said intermediate ribs being separated from one another by a center groove that is circular circumferentially of said tire tread and does not zig zag or meander around the circumference of said tread and is located centrally of the width of said tread, said tread having a road surface engaging footprint with a footprint width that has footprint width boundaries, each of said outer ribs having an outer rib width that extends from one of said outer grooves to said footprint width boundaries, shoulder buttresses outwardly of said outer ribs beyond said footprint width boundaries, a plurality of circumferentially-spaced outer rib cross slots extending into said outer ribs from said outer grooves, said outer rib cross slots extending substantially more than one-half the width of each of said outer ribs but less than the entire width of each of said outer ribs, a plurality of circumferentially-spaced shoulder buttress cross slots in said shoulder buttresses, said buttress cross slots being located intermediate said outer rib cross slots and extending across said footprint boundaries into said outer ribs, said outer rib cross slots and buttress cross slots extending past one another in nonintersecting overlapping relationship with an overlap length that is between 25–35% of the length of said outer rib cross slots, a plurality of circumferentially-spaced intermediate rib cross slots extending from said outer grooves into said intermediate ribs that are located adjacent said outer grooves, and each of said plurality of intermediate ribs having a width that is less than the width of each of said outer ribs but greater than one-half the width of each of said outer ribs.

14. The tire of claim 13 inducing outer rib cross sipes extending into said outer ribs from said outer grooves generally opposite said buttress cross slots, said outer rib cross sipes terminating substantially short of said buttress cross slots.

15. The tire of claim 14 wherein said rib cross slots are circumferentially-spaced a plurality of different distances to define a plurality of rib blocks therebetween having a plurality of different rib block lengths, shorter ones of said rib block lengths having single cross sipes extending thereinto from said outer grooves and longer ones of said rib block lengths having double cross sipes extending thereinto from said outer grooves, and each of said sipes that extends into said intermediate ribs from said outer grooves extending not more than one-half the width of each said intermediate rib.

16. The tire of claim 13 including buttress cross sipes generally opposite said rib cross slots, said buttress sipes being located entirely within said buttresses without crossing over said footprint boundaries into said outer ribs.

17. In a tire having a circumferential tread with a circumferential center groove and two circumferential outer grooves, each of said outer grooves being wider than said center groove; a road engaging intermediate rib between each of said outer grooves and said center groove, a road engaging outer rib outwardly of each of said outer grooves, each of said outer ribs being wider than each of said intermediate ribs, cross slots extending into said intermediate ribs and said outer ribs from said outer grooves in directions transversely and circumferentially of said tread, said cross slots on opposite sides of each of said outer grooves extending in the same circumferential direction and forming a herringbone pattern, and said cross slots extending outwardly from opposite sides of one of said outer grooves in one circumferential direction while said cross slots extend outwardly from opposite sides of the other of said outer grooves in an opposite circumferential direction whereby said herringbone patterns are reversed on opposite sides of said center groove.

18. The tire of claim 17 including cross sipes extending into said intermediate ribs and said outer ribs from said outer grooves, said cross sipes on opposite sides of each of said outer grooves forming a herringbone pattern.

19. The tire of claim 17 wherein said cross slots in said intermediate ribs extend less than the width of each intermediate rib to provide circumferential intermediate rib portions adjacent said center groove that are devoid of cross slots, and said intermediate rib portions having a plurality of circumferentially-spaced cross sipes therein.

20. The tire of claim 19 wherein said cross sipes in said intermediate rib portions intersect and form chevron patterns with said cross sipes that extend into said intermediate ribs from said outer grooves.

21. The tire of claim 20 wherein said cross sipes in said circumferential intermediate rib portions adjacent said center groove do not intersect said center groove.

22. In a tire having sidewalls and a road engaging circumferential tread with a pair of circumferential outer grooves, road engaging outer ribs outwardly of said outer grooves and having road engaging surfaces, shoulder buttresses between said sidewalls and said outer ribs, a plurality of circumferentially-spaced rib cross slots extending into said outer ribs from said outer grooves, a plurality of circumferentially-spaced shoulder buttress cross slots that are spaced circumferentially of said tread and extend transversely of said tread from said shoulder buttresses into said outer ribs intermediate said rib cross slots in circumferentially-spaced overlapping relationship to said rib cross slots, each of said shoulder buttress cross slots being longer than each of said rib cross slots, each of said outer ribs having a circumferentially extending circular slot that is circular circumferentially of said tread and intersects each of said rib cross slots and each of said buttress cross slots, each of said rib cross slots having a rib cross slot depth, each of said circumferential slots having a circumferential slot depth, each of said outer grooves having an outer groove depth, said circumferential slot depth being less than said rib cross slot depth, said rib cross slot depth being less than said outer groove depth, and said rib cross slots and shoulder cross slots having closed ends with end surfaces that intersect said road engaging surfaces at an angle between 35–42°.

23. The tire of claim 22 inducing outer rib cross sipes extending into said outer ribs from said outer grooves generally opposite from and terminating short of said shoulder buttress cross slots.

24. The tire of claim 22 inducing shoulder buttress cross sipes extending toward said outer rib cross slots in outwardly-spaced relationship thereto.

25. The tire of claim 22 wherein said plurality of rib cross slots are circumferentially-spaced a plurality of different distances to define a plurality of different rib block lengths therebetween, shorter ones of said different rib block lengths having single cross sipes extending thereinto from said outer grooves, and longer ones of said rib block lengths having double cross sipes extending thereinto from said outer grooves.

26. The tire of claim 22 wherein said shoulder buttress cross slots overlap between 25–35% of the length of said outer rib cross slots.

27. In a tire having a circumferential tread:
    said tread having a road engaging surface that consists essentially of four circumferential ribs including two road engaging intermediate ribs and two road engaging outer ribs;
    shoulder buttresses outwardly of said outer ribs;
    three circumferential grooves separating said ribs, said grooves including a center groove between said intermediate ribs and an outer groove between each of said intermediate ribs and an adjacent outer rib, each of said grooves having substantially the same groove depth;
    each of said ribs having a rib width;
    each of said four ribs having a plurality of cross slots that extend thereinto from said outer grooves;
    each of said four ribs having a plurality of cross sipes;
    said cross slots and cross sipes being circumferentially-spaced around said ribs;
    each of said plurality of cross slots and cross sipes extending less than the entire width of the intermediate or outer rib in which it is located;
    said plurality of cross slots including circumferentially-spaced intermediate rib cross slots extending into said intermediate ribs from said outer grooves and circumferentially-spaced outer rib cross slots extending into said outer ribs from said outer grooves;
    adjacent ones of said intermediate rib cross slots and said outer rib cross slots having rib blocks therebetween;
    said intermediate rib cross slots and said outer rib cross slots being circumferentially spaced-apart a plurality of different distances to provide said rib blocks with a plurality of different rib block lengths that include short block lengths and long block lengths;
    at least said short block lengths in both said intermediate ribs and said outer ribs having a single sipe extending thereinto from said outer grooves;
    at least said long block lengths in both said intermediate ribs and said outer ribs having double sipes extending thereinto from said outer grooves;
    said shoulder buttresses having a plurality of circumferentially-spaced buttress cross slots generally opposite from and generally aligned with said single and double sipes in said outer ribs in spaced relationship thereto;
    said center groove having center groove sidewalls; and
    said center groove sidewalls being continuous and uninterrupted by any of said plurality of cross slots and cross sipes or by any other openings.

28. The tire of claim 27 wherein said outer rib cross slots and buttress cross slots are spaced from one another circumferentially of said tread and extend past one another transversely of said tread to define an overlap that is between 25–35% of the length of said outer rib cross slots.

29. The tire of claim 27 wherein each of said buttress cross slots extends into a said outer rib a distance that is less than one-half width of each of said outer ribs.

30. In a tire having a circumferential tread that includes a pair of intermediate ribs separated by a circumferential center groove, a circumferential outer groove on the opposite side of each rib in said pair of intermediate ribs from said center groove, a plurality of circumferentially-spaced cross slots extending into said intermediate ribs from said outer grooves, said cross slots extending less than he width of each rib to provide each rib with a circumferential outer intermediate rib portion adjacent each said outer groove that has said cross slots therein and a circumferential inner intermediate rib portion adjacent said center groove that is devoid of cross slots, said cross slots having rib blocks therebetween and being circumferentially spaced-apart a plurality of different distances to provide said rib blocks with a plurality of different rib block lengths that include short block lengths and long block lengths, at least said short block lengths having a single cross sipe extending thereinto from said outer grooves, at least said long block lengths having double cross sipes extending thereinto from said outer grooves, and a plurality of circumferentially-spaced inner intermediate rib portion cross sipes in said inner intermediate rib portions of said intermediate ribs intersecting said single and double cross sipes and said cross slots and forming chevron patterns therewith.

31. The tire of claim 30 wherein said center groove has center groove sidewalls and said inner intermediate rib portion cross sipes do not extend through said center groove sidewalls.

* * * * *